US009703466B2

United States Patent
Chen

(10) Patent No.: US 9,703,466 B2
(45) Date of Patent: Jul. 11, 2017

(54) METHOD, DEVICE AND TERMINAL FOR IMPLEMENTING ROTATION OF FLOATING WINDOW

(71) Applicant: TENCENT TECHNOLOGY (SHENZHEN) COMPANY LIMITED, Shenzhen, Guangdong (CN)

(72) Inventor: Jianming Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/908,936

(22) PCT Filed: Aug. 4, 2014

(86) PCT No.: PCT/CN2014/083611
§ 371 (c)(1),
(2) Date: Jan. 29, 2016

(87) PCT Pub. No.: WO2015/014322
PCT Pub. Date: Feb. 5, 2015

(65) Prior Publication Data
US 2016/0179357 A1    Jun. 23, 2016

(30) Foreign Application Priority Data
Aug. 2, 2013    (CN) .......................... 2013 1 0334914

(51) Int. Cl.
*G06F 3/048*    (2013.01)
*G06F 3/01*    (2006.01)
(Continued)

(52) U.S. Cl.
CPC .......... *G06F 3/04847* (2013.01); *G06F 3/017* (2013.01); *G06F 3/048* (2013.01);
(Continued)

(58) Field of Classification Search
CPC ................. G06F 2200/1614; G06F 2200/1637
See application file for complete search history.

(56) References Cited

U.S. PATENT DOCUMENTS

2006/0274087 A1* 12/2006 Kim ...................... G06F 1/1622
345/649
2012/0257025 A1    10/2012 Kim et al.

FOREIGN PATENT DOCUMENTS

CN    101789132 A    7/2010
CN    102662659 A    9/2012
(Continued)

OTHER PUBLICATIONS

International Search Report for Application No. PCT/CN2014/083611, in 4 pages.
(Continued)

*Primary Examiner* — Andrea Long
(74) *Attorney, Agent, or Firm* — Knobbe Martens Olson & Bear LLP

(57) ABSTRACT

Disclosed are a method, device and terminal for implementing rotation of a floating window. The method comprises: providing, by user equipment, a picture container supporting a rotation attribute for a user interface (UI) floating window view; adding the UI floating window view to the picture container; when the orientation is changed, acquiring a rotation angle of the UI floating window view, redrawing the rotated UI floating window view, and acquiring a rotation reduction matrix; and when a user click event is detected, performing rotation reduction conversion on the coordinates at the user click position. The technical solution of the present invention has the beneficial effects of low calculation quantity, high processing efficiency and natural appearance of a floating window UI component.

18 Claims, 8 Drawing Sheets

(51) Int. Cl.
*G06F 3/0484* (2013.01)
*G06F 3/0481* (2013.01)

(52) U.S. Cl.
CPC ........ *G06F 3/0481* (2013.01); *G06F 3/04842* (2013.01); *G06F 2200/1614* (2013.01); *G06F 2200/1637* (2013.01)

(56) References Cited

FOREIGN PATENT DOCUMENTS

| CN | 102695034 A | 9/2012 |
| CN | 102736843 A | 10/2012 |
| CN | 102903052 A | 1/2013 |

OTHER PUBLICATIONS

Written Opinion of the International Searching Authority with Translation for International Application No. PCT/CN2014/083611, mailed Nov. 4, 2014, in 10 pages.
International Search Report for Application No. PCT/CN2014/083611, mailed Nov. 4, 2014, in 4 pages.

* cited by examiner

METHOD, DEVICE AND TERMINAL FOR IMPLEMENTING ROTATION OF FLOATING WINDOW

RELATED APPLICATION

This application is a national phase of International Application No. PCT/CN2014/083611, titled "METHOD, DEVICE AND TERMINAL FOR IMPLEMENTING ROTATION OF FLOATING WINDOW", filed on Aug. 4, 2014, which claims priority to Chinese Patent Application No. 201310334914.7, filed with the Chinese Patent Office on Aug. 2, 2013 and titled "METHOD, APPARATUS AND TERMINAL FOR IMPLEMENTING AUTOMATIC ROTATION OF FLOATING WINDOW WITH SCREEN", which is incorporated herein by reference in its entirety.

FIELD OF THE TECHNOLOGY

The present disclosure relates to the field of floating window display technologies, and in particular, to a method, an apparatus and a terminal for implementing rotation of a floating window.

BACKGROUND OF THE DISCLOSURE

With the rapid advancement of intelligent terminal technologies and the dramatic development of services of intelligent terminals, interaction between the intelligent terminals and users by using a floating window is increasingly diversified. The floating window is a pop-up, movable, and independent window, which implements functions such as prompting and notification. The floating window is also referred to as a "floating window". In daily life, functions such as "floating window preview" can be implemented on a terminal such as a smart phone or a tablet computer. In this way, efficiency of user operations can be improved, the terminal is more user-friendly, and it is more convenient for the user to use the terminal.

An application on an Android™ platform may further provide some additional interaction after a user exits the interface of the application, and the interaction may be achieved by using a floating window user interface (USER INTERFACE, UI). To provide an intuitive and natural interaction experiences achieved by using the floating window UI, the floating window needs to synchronously rotate as the screen rotates.

SUMMARY

Embodiments of the present invention provide a method, an apparatus and a terminal for implementing rotation of a floating window, which achieve a relatively high rotation efficiency of a floating window UI component, a relatively low workload, and a low technical risk.

The embodiments of the present invention use the following technical solutions:

According to a first aspect, an embodiment of the present invention provides a method for implementing rotation of a floating window, including:

providing, by a terminal device, an image container supporting a rotation attribute for a user interface (UI) floating window view to be displayed;

adding, by the terminal device, the UI floating window view into the image container;

when an orientation corresponding to a stack-top application in an activated-state application stack of a system and/or an orientation detected by a system gravity sensor is changed, acquiring, by the terminal device, a rotation angle of the UI floating window view, redrawing the UI floating window view which has been rotated according to the rotation angle and the image container, and acquiring a rotation recovery matrix; and when a user click event is detected, performing, by the terminal device, rotation recovery transformation on coordinates of a user click position according to the rotation recovery matrix and the image container, to obtain coordinates in the UI floating window view which coordinates correspond to the user click position before the UI floating window view is rotated, so that the event can be delivered to an internal UI component of the floating window which component corresponds to the event before rotation of the UI floating window view.

According to a second aspect, an embodiment of the present invention provides an apparatus for implementing rotation of a floating window, including:

an image container providing unit, configured to provide a image container supporting a rotation attribute for a user interface (UI) floating window view to be displayed;

an image content generating unit, configured to add the UI floating window view into the image container;

an orientation acquiring unit, configured to, when an orientation corresponding to a stack-top application of a system and/or an orientation detected by a system gravity sensor is changed, acquire a rotation angle of the UI floating window view, redraw the UI floating window which has been rotated according to the rotation angle, and acquire a rotation recovery matrix; and a coordinate rotation recovery transformation unit, configured to, when a user click event is detected, perform rotation recovery transformation on coordinates of the user click event according to the rotation recovery matrix, to obtain coordinates in the UI floating window view which correspond to the user click position before the UI floating window view is rotated, so that the event can be delivered to an internal UI component of the floating window which component corresponds to the event before rotation of the UI floating window view.

According to a third aspect, an embodiment of the present invention provides a terminal for implementing rotation of a floating window, and the terminal including the foregoing apparatus for implementing rotation of a floating window.

The method, apparatus and terminal for implementing rotation of a floating window in the technical solutions have the following beneficial effects:

According to the technical solutions of the embodiments of the present invention, a floating window UI component is generated by redrawing a floating window and performing rotation recovery transformation on coordinates. In this way, a computational amount is relatively small, efficiency is higher, and an appearance of the floating window UI component is more natural.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show only some embodiments of the present disclosure, and a person of ordinary skill in the art may still derive other drawings based on content of the embodiments of the present invention and these accompanying drawings without creative efforts.

DESCRIPTION OF EMBODIMENTS

Figure 1:
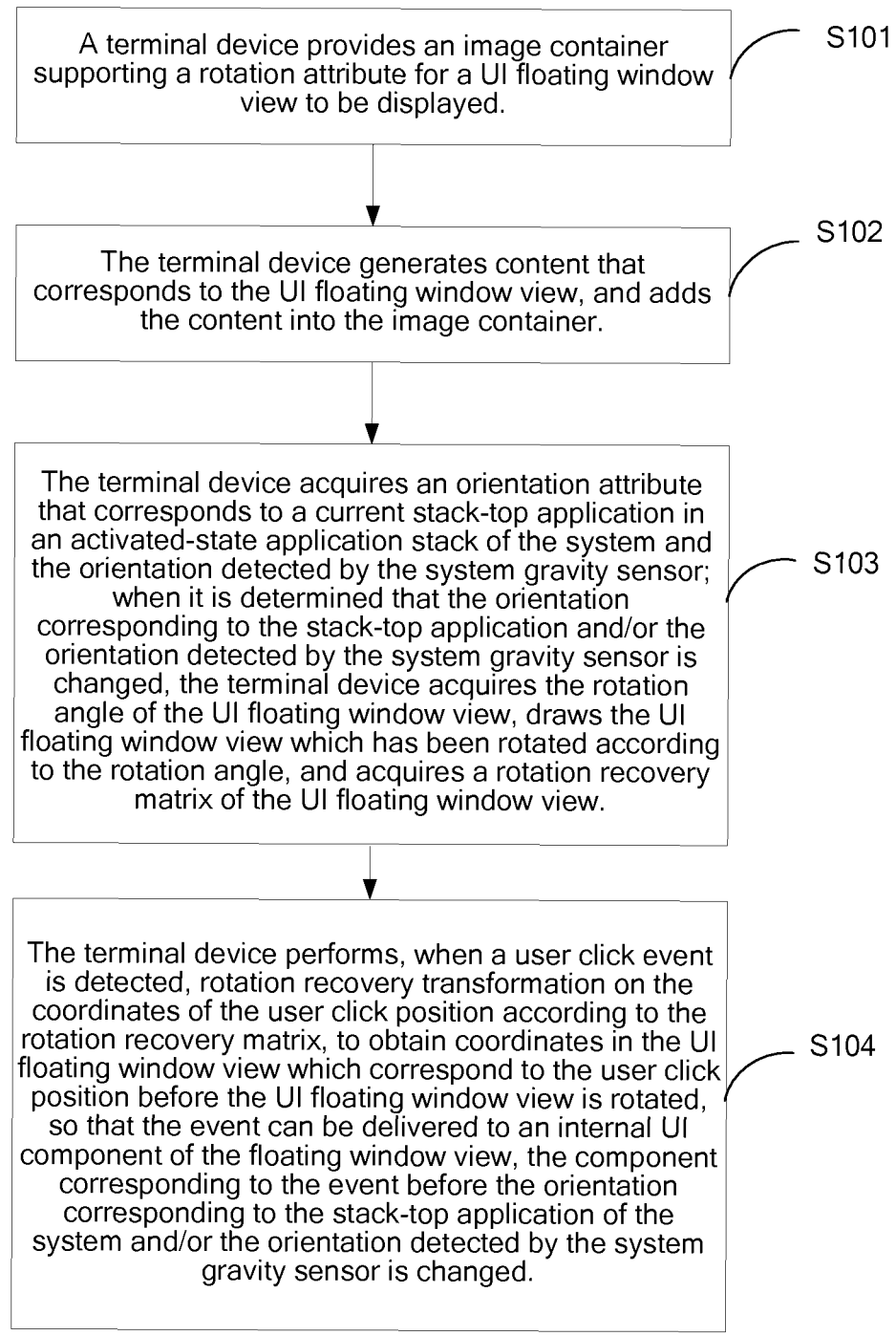
FIG. 1 is a flowchart of a method for implementing rotation of a floating window according to an embodiment of the present invention.

To make technical problems solved, technical solutions used and technical effects achieved in the present disclosure more clear, the following further describes the technical solutions of the embodiments of the present invention in detail with reference to the accompanying drawings. Apparently, the described embodiments are merely some of the embodiments of the present invention rather than all of the embodiments. All other embodiments obtained by a person skilled in the art based on the embodiments of the present invention without creative efforts shall fall within the protection scope of the present disclosure.

To achieve a rotation capability on an Android platform, the following manners may be adopted.

Manner 1: All Android UI components are modified, so that the components support a floating window to adaptively rotate as the screen rotates. In this way, in addition to all the Android UI components, an Android UI framework needs to be modified, leading to a huge workload and a high technical risk.

Manner 2: Multiple sets of candidate Views are provided for all Views within a floating window. A candidate View is selected according to the rotation status of the screen for display. Although this solution can avoid large-scale modification of the Android UI framework, operation is redundant and operation efficiency is low.

Manner 3: The Views are synchronously rotated by using an existing Android View Rotate Animation when rotation of the screen is detected, and are frozen when the animation is completed at the end of the rotation. This solution requires that animation displaying is performing for all Views (recursively, including all subViews) of all floating window UIs. Therefore, implementation efficiency is low and control is redundant.

The method for implementing rotation of a floating window according to embodiments of the present invention is mainly applied to various terminal devices such as an intelligent terminal device having a touch screen, including a smart phone, an e-book reader, a Moving Picture Experts Group Audio Layer III (MP3) player, a Moving Picture Experts Group Audio Layer IV (MP4) player, a notebook computer, a tablet computer, and the like. In an implementation manner, the touch screen may include a resistive touch screen or a capacitive touch screen.

This technology provides a universal and high-efficiency technical solution for implementing rotation of a floating window UI. In an implementation manner, a terminal device first provides a view container (ViewGroup) in the Android system to support the rotation attribute, and uses the ViewGroup as a container of the content view, to be displayed, of a UI floating window. A corresponding content View is generated by using the function inflate( ) of inflater to be added into the ViewGroup. Inflater is a method for interpreting a UI layout file (which may be described by using, for example, xml) and generating a corresponding view in an Android system. The terminal device acquires an orientation that corresponds to a current activated-state application (referred to as an Activity) and monitors the stack top of the Activity, so as to track the change of the orientation that corresponds to the Activity. The terminal device acquires the current orientation of the gravity sensor and registers the monitor of the gravity sensor, so as to track the direction of the sensor. The terminal device performs rotation compensation according to the direction of the sensor and the orientation of the screen, redraws the floating window, and acquires a rotation recovery matrix. When a user performs a click in a region of the floating window, the terminal device receives the click event, and performs rotation recovery transformation on coordinates of the click event according to the rotation recovery matrix, so that the event can be delivered to a corresponding internal UI component of the floating window.

Refer to FIG. 1, which is a flowchart (described in detail in the following by using an Android system as an example) of a method for implementing rotation of a floating window according to Embodiment 1 of the method of the present disclosure, and the method includes the following.

S101: A terminal device provides an image container supporting a rotation attribute for a UI floating window view to be displayed.

First, a view group (ViewGroup, also referred to as RotateLayout) supporting the rotation attribute is provided, and the ViewGroup is used as the image container of the UI floating window view to be displayed.

S102: The terminal device generates content that corresponds to the UI floating window view, and adds the content into the image container.

The content may include a content view (ContentView) in the UI floating window view, such as a basic control and a UI floating window subview. The image container includes content corresponding to the UI floating window view. In an implementation manner, the image container may be a view container (ViewGroup) in the Android system.

In an implementation manner, content views that correspond to the basic control and the subview in the UI floating window view may be separately generated according to a pre-defined view layout, and added into the ViewGroup.

For example, a corresponding content view may be generated by calling inflate( ) in inflater of the Android system, and added into the foregoing view group supporting the rotation attribute. The inflater in the Android system may interpret a UI layout file, and generate a corresponding content view.

In an implementation manner, drawing control right may be first handed over to RotateLayout according to a UI drawing principle of the Android, and then transferred from RotateLayout to a subview inside the RotateLayout.

In an implementation manner, the terminal device may add the UI floating window view into the image container.

S103: The terminal device acquires an orientation attribute that corresponds to a current stack-top application in an activated-state application stack of the system and the orientation detected by the system gravity sensor; when it is determined that the orientation corresponding to the stack-top application and/or the orientation detected by the system gravity sensor is changed, the terminal device acquires the rotation angle of the UI floating window view, draws the UI floating window view which has been rotated according to the rotation angle, and acquires a rotation recovery matrix of the UI floating window view.

In an implementation manner, the system is a terminal having an Android platform, and the orientation angle value corresponding to the orientation may be an angle value that is equal to or a multiple of 90 degrees. Specifically, the orientation may include a portrait mode, a reverse portrait mode, a landscape mode and a reverse landscape mode. In this way, corresponding orientation angle values are respectively 0 degree, 180 degrees, 90 degrees and 270 degrees. Values of rotation angles (anticlockwise) of the UI floating window view may include 0 degree, 180 degrees, 90 degrees and 270 degrees.

In an implementation manner, the orientation corresponding to the stack-top application may be a preset application orientation of the stack-top application. For example, the preset orientation of a video playback application is landscape, and the preset orientation of a game application, Angry Bird, is landscape.

In an implementation manner, the terminal device may further use the following method, including: determining whether the orientation of the stack-top application is changed; and determining, by the terminal device, when the orientation angle of the stack-top application at the timeout moment of the stack-top application timer is different from the orientation angle of the stack-top application at the startup moment of the stack-top application timer, that the orientation corresponding to the current stack-top application of the system is changed.

In an implementation manner, the orientation angle A1 corresponding to the current stack-top application of the system is acquired, the duration of the stack-top application orientation monitoring timer is set to T1, and the orientation monitoring timer is started. If the orientation angle A2 of the stack-top application at the time that the timer T1 times out is different from A1, it is determined that the orientation of the stack-top application is changed.

For example, when the timer T1 is started, the stack-top application is a video playback application, and the corresponding orientation angle A1 is 90 degrees. When the timer T1 times out, the stack-top application is a short message application, and the corresponding orientation angle A2 is 0 degree. The two orientation angles are different, and therefore, it is determined that the orientation of the stack-top application is changed.

In an implementation manner, the rotation angle may be obtained according to orientation angle values before and after the orientation is changed. For example, when the orientation of the stack-top application is changed from portrait (whose orientation angle is 0 degree) to landscape (whose orientation angle is 90 degrees), the rotation angle (anticlockwise) of the UI floating window view is a difference between values of the orientation angles of the portrait and the landscape, that is, 270 degrees. In another implementation manner, when the system gravity sensor detects that the orientation of the terminal device is changed from portrait (whose orientation angle is 0 degree) to reverse portrait (whose orientation angle is 180 degrees), the rotation angle of the UI floating window view is 180 degrees.

In an implementation manner, when the orientation corresponding to the stack-top application of the system is changed, the terminal device acquires the rotation angle that corresponds to the stack-top application. When the orientation detected by the system gravity sensor is changed, the terminal device acquires the rotation angle that is detected by the system gravity sensor. When the orientation corresponding to the stack-top application of the system and the orientation detected by the system gravity sensor both are changed, the terminal device acquires a sum of the rotation angle that corresponds to the stack-top application and the rotation angle that is detected by the system gravity sensor.

Figure 10A:
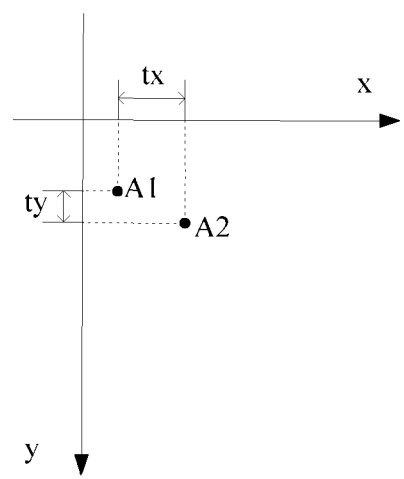
FIG. 10A is a schematic diagram of a rotation process according to an embodiment of the present invention.
Figure 10B:
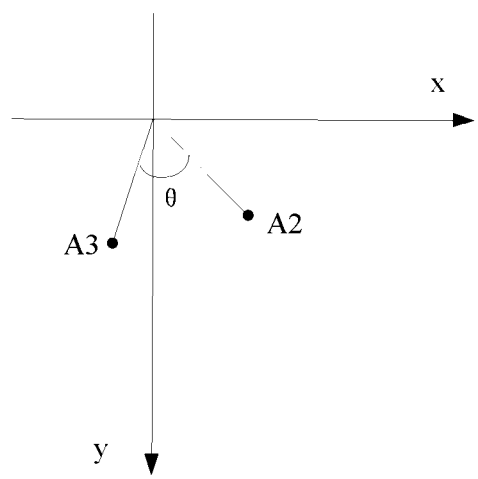
FIG. 10B is a schematic diagram of another rotation process according to an embodiment of the present invention.

In an implementation manner, FIG. 10A and FIG. 10B are schematic diagrams of a rotation process according to an embodiment of the present invention. FIG. 10A shows a process of translating a coordinate point A1 (whose coordinates are (x1, y1)) to a coordinate point A2 (whose coordinates are (x2, y2)) on a plane. The translation transformation formula thereof is:

$$\begin{bmatrix} x2 \\ y2 \\ 1 \end{bmatrix} = \begin{bmatrix} 1 & 0 & t_x \\ 0 & 1 & t_y \\ 0 & 0 & 1 \end{bmatrix} \begin{bmatrix} x1 \\ y1 \\ 1 \end{bmatrix} = T(t_x, t_y) \begin{bmatrix} x1 \\ y1 \\ 1 \end{bmatrix} \qquad (1)$$

where $$T(t_x, t_y) = \begin{bmatrix} 1 & 0 & t_x \\ 0 & 1 & t_y \\ 0 & 0 & 1 \end{bmatrix},$$

and $t_x$ is a difference between $x_2$ and $x_1$, that is, the magnitude of horizontal translation; and $t_y$ is a difference between $y_2$ and $y_1$, that is, the magnitude of vertical translation.

FIG. 10B shows a process of rotating a coordinate point A2 (whose coordinates are (x2, y2)) θ degrees around an origin of coordinates to a coordinate point A3 on a plane. The rotation transformation formula thereof is:

$$\begin{bmatrix} x3 \\ y3 \\ 1 \end{bmatrix} = \begin{bmatrix} \cos\theta & -\sin\theta & 0 \\ \sin\theta & \cos\theta & 0 \\ 0 & 0 & 1 \end{bmatrix} \begin{bmatrix} x2 \\ y2 \\ 1 \end{bmatrix} = R(\theta) \begin{bmatrix} x2 \\ y2 \\ 1 \end{bmatrix} \qquad (2)$$

where $$R(\theta) = \begin{bmatrix} \cos\theta & -\sin\theta & 0 \\ \sin\theta & \cos\theta & 0 \\ 0 & 0 & 1 \end{bmatrix}.$$

Rotating a point A θ degrees around a specified point (whose coordinates are supposed to be $(x_f, y_f)$) on a plane may include the following three steps:

First, the point A is horizontally translated by $-x_f$, and then is vertically translated by $-y_f$ to obtain A'; such a process may be expressed according to formula (1) by using a translation transformation matrix $T(-x_f, -y_f)$.

A' is translated and then rotated θ degrees around the origin, to obtain A''; such a process may be expressed according to formula (2) by using a rotation transformation matrix $R(\theta)$.

Then, the coordinate point A'' obtained by rotation is horizontally translated by $x_f$, and is vertically translated by $y_f$ to obtain A'''; such a process may be expressed according to formula (1) by using a translation transformation matrix $T(x_f, y_f)$.

The foregoing three steps are combined together, to obtain the following rotation recovery matrix for θ-degree rotation around a specified point (whose coordinates are supposed to be $(x_f, y_f)$):

$$R(x_f, y_f; \theta) = T(x_f, y_f)R(\theta)T(-x_f, -y_f) \quad (3)$$

$$= \begin{bmatrix} 1 & 0 & x_f \\ 0 & 1 & y_f \\ 0 & 0 & 1 \end{bmatrix} \begin{bmatrix} \cos\theta & -\sin\theta & 0 \\ \sin\theta & \cos\theta & 0 \\ 0 & 0 & 1 \end{bmatrix} \begin{bmatrix} 1 & 0 & -x_f \\ 0 & 1 & -y_f \\ 0 & 0 & 1 \end{bmatrix}$$

$$= \begin{bmatrix} \cos\theta & -\sin\theta & x_f(1-\cos\theta) + y_f\sin\theta \\ \sin\theta & \cos\theta & y_f(1-\cos\theta) - x_f\sin\theta \\ 0 & 0 & 1 \end{bmatrix}$$

S104: The terminal device performs, when a user click event is detected, rotation recovery transformation on the coordinates of the user click position according to the rotation recovery matrix, to obtain coordinates in the UI floating window view which correspond to the user click position before the UI floating window view is rotated, so that the event can be delivered to an internal UI component of the floating window view, the component corresponding to the event before the orientation corresponding to the stack-top application of the system and/or the orientation detected by the system gravity sensor is changed.

In an implementation manner, the rotation recovery transformation may be performed according to the rotation recovery matrix in the following manner:

multiplying the coordinates by the rotation recovery matrix, to obtain coordinates in the UI floating window view which correspond to the user click position before the UI floating window view is rotated.

In an implementation manner, in the Android system, the rotation recovery transformation may be performed on the coordinates of the user click position by using methods related to RotateLayout, such as onDraw( ), dispatchDraw( ), dispatchTouchEvent( ), onLayout( ), and onMeasure( ), to obtain coordinates in the UI floating window view which correspond to the user click position before the UI floating window view is rotated.

In this way, the user click event can be delivered to an internal UI component of the floating window view which corresponds to the event before the orientation corresponding to the stack-top application of the system and/or the orientation detected by the system gravity sensor is changed, thereby implementing transparent support for rotation.

It should be noted that, the program of the UI drawing principle may vary in different intelligent terminal operating systems or different programming languages for implementing floating window technologies. A person of ordinary skill in the art may redraw a floating window UI component by using an image container and implement rotation inversion transformation according to different operating systems or different programming languages.

In conclusion, according to the method for implementing rotation of a floating window in this embodiment of the present invention, a floating window UI component is generated by using methods such as redrawing of the floating window and rotation inversion transformation of coordinates. In this way, the rotation of the floating window can be implemented without changing any UI component in the original floating window, preparing multiple sets of images for selection, or displaying an animation. Therefore, efficiency of rotating the floating window is improved, and computational amount and complexity of the terminal device are reduced.

Figure 2:
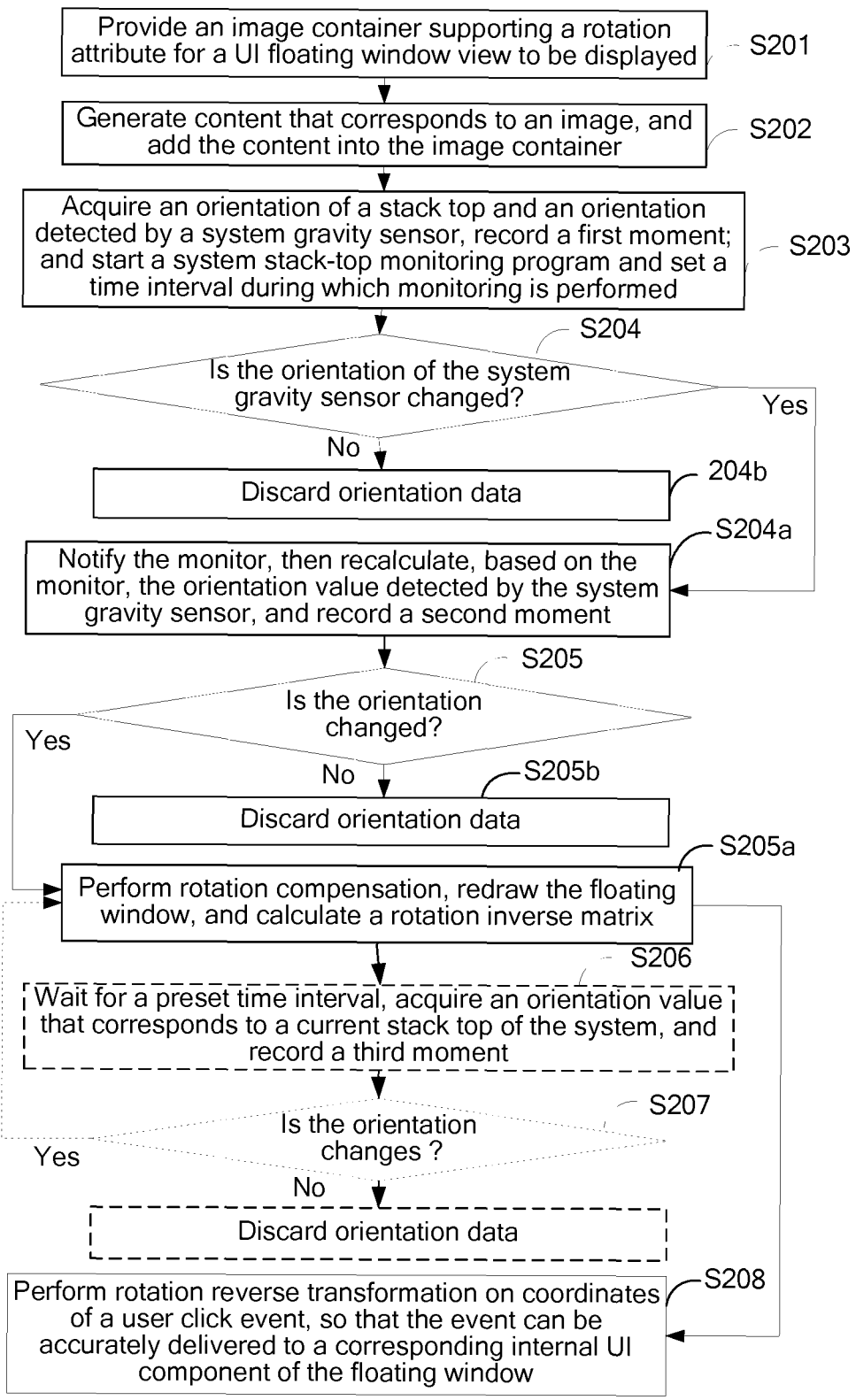
FIG. 2 is a flowchart of a method for implementing rotation of a floating window according to another embodiment of the present invention.

Refer to FIG. 2, which is a flowchart of a method for implementing rotation of a floating window according to Embodiment 2 of the method of the present disclosure. Steps S201, S202 and S208 are respectively the same as S101, S102 and S104 in Embodiment 1, and differences therebetween lie in steps S203, S204, S205, S206 and S207. The method includes the following steps.

S201: A terminal device provides an image container supporting a rotation attribute for a UI floating window view to be displayed.

S202: The terminal device generates content that corresponds to the UI floating window view, and adds the content into the image container, the content being the UI floating window view.

S203: The terminal device acquires an orientation that corresponds to a current stack-top application of a system and an orientation detected by a system gravity sensor, records the current moment as a first moment; and registers a monitor for the system gravity sensor, starts a system stack-top monitoring program, and sets a time interval during which monitoring is performed.

In an implementation manner, the time interval for monitoring may be set to 30 sec to 2 min according to an actual situation. During this interval, it is possible that the orientation of the terminal is changed due to the rotation of the terminal, or the terminal returns to its original position after the rotation. A user action may be more clearly known according to the preset time interval, so as to perform an operation that further reduces memory computation.

S204: When the system gravity sensor detects change in orientation, the terminal device notifies the monitor, recalculates, based on the monitor, an orientation value detected by the system gravity sensor, and records the current moment as a second moment.

In an implementation manner, this step includes: determining whether the orientation detected by the system gravity sensor has been changed. If being changed, performing S204a of notifying the monitor, recalculating, based on the monitor, the orientation value detected by the system gravity sensor, and recording the current moment as the second moment; or if no change occurs, performing S204b of discarding acquired orientation data.

S205: The terminal device compares the orientation acquired at the first moment with the orientation acquired at the second moment, and if they are different, performs step S205a; otherwise, performs step S205b.

In an implementation manner, this step includes: determining whether there is difference between the orientation acquired at the first moment and the orientation acquired at the second moment, and if there is, performing step S205a of notifying the monitor, recalculating, based on the monitor, the orientation value detected by the system gravity sensor, and recording the current moment as the second moment; or if there is no difference, performing step S205b.

S205a: It is to perform rotation compensation, redraw the floating window, acquire a rotation recovery matrix and then perform step 208.

S205b: The terminal device discards the acquired orientation data.

S208: The terminal device performs rotation recovery transformation on coordinates of the user click event, so that the event can be accurately delivered to an internal UI component of the floating window, the component corresponding to the event before the orientation corresponding to the stack-top application of the system and/or the orientation detected by the system gravity sensor is changed.

Further, Embodiment 2 may further include the following steps:

S206: The terminal device waits for a preset time interval, re-acquires an orientation value that corresponds to a current stack-top application of the system, and records the current moment as a third moment.

S207: The terminal device compares the orientation acquired at the second moment with the orientation acquired at the third moment; and if they are different, performs rotation compensation, redraws the floating window and acquires a rotation inverse matrix.

In an implementation manner, this step includes: determining whether there is difference between the orientation acquired at the second moment and the orientation acquired at the third moment; and if there is, going back to the foregoing step S205a; or if there is no difference, discarding the current acquired orientation data.

In conclusion, in this embodiment, due to the use of the time interval, if the terminal detects that no change in orientation occurs from the first moment to the second moment, the following steps may be performed: discarding data obtained at the second moment or going back to step S203; and only when a change in orientation is detected, the floating window is redrawn and the rotation recovery matrix is acquired. In this way, a computational amount can be reduced, efficiency is improved, and an appearance of a floating window UI component is more natural. Further, system resources are saved, and a computational amount of memory data is reduced.

Figure 3:
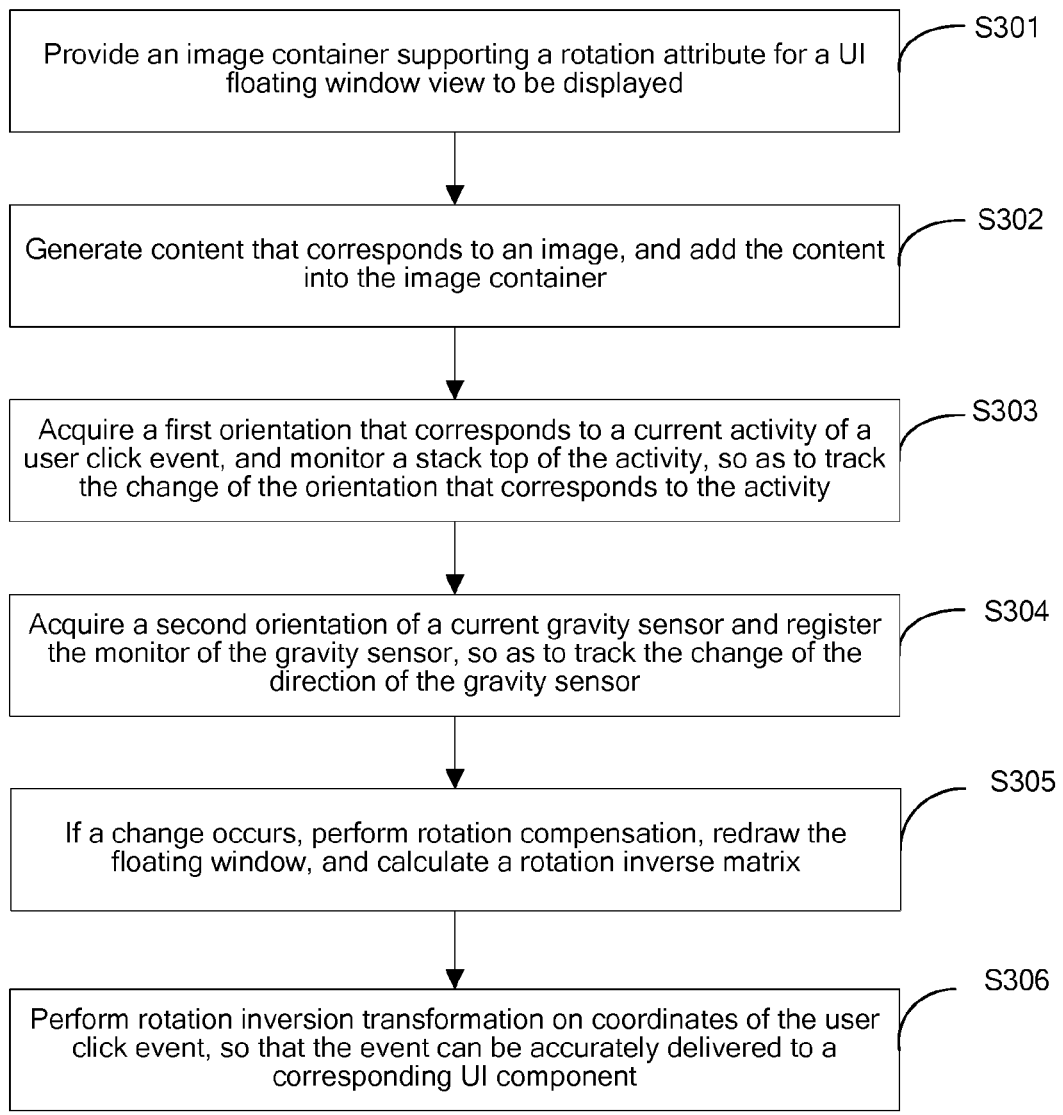
FIG. 3 is a flowchart of a method for implementing rotation of a floating window according to still another embodiment of the present invention.

Refer to FIG. 3, which is a flowchart of a method for implementing rotation of a floating window according to an embodiment of the present invention. Steps S301, S302 and S306 are respectively the same as S101, S102 and S104 in Embodiment 1, and differences therebetween lie in steps S303, S304, and S305. The method includes the following steps.

S301: An image container supporting a rotation attribute is provided for a UI floating window view to be displayed.

S302: Content that corresponds to the UI floating window view is generated and added into the image container, the content being the UI floating window view.

S303: A first orientation that corresponds to a current activity of a user click event is acquired, and a stack top of the activity is monitored, so as to track the change of the orientation that corresponds to the activity.

A user trend may be further confirmed by acquiring and monitoring the orientation at which a user performs click.

S304: A second orientation of a current gravity sensor is acquired and the monitor of the gravity sensor is registered, so as to track the change of the direction of the gravity sensor.

A transformation trend of the terminal may be further confirmed by acquiring and monitoring the orientation of the gravity sensor.

S305: If the orientation corresponding to the stack-top application and/or the orientation detected by the system gravity sensor is changed, it is to perform rotation compensation, redraw the floating window and acquire a rotation recovery matrix.

S306: When a user click event is detected, according to the rotation recovery matrix, rotation recovery transformation is performed on coordinates of the user click event, so that the event can be delivered to a corresponding internal UI component of the floating window.

Taking an Android platform as an example for description, an orientation (denoted as ContextOrientation) corresponding to a current Activity is acquired and the Activity stack top is monitored, so as to track the change of the orientation that corresponds to the Activity.

An orientation (denoted as SensorOrientation) of a current gravity sensor is acquired and a monitor of the gravity sensor is registered, so as to track a direction of the sensor.

In conclusion, in this embodiment, operations such as redrawing a floating window and acquiring a rotation inverse matrix are performed by tracking changes in orientations corresponding to a user click activity and a gravity sensor, so that the floating window UI component is implemented more concretely, meticulously and accurately. This technical solution achieves a relatively small computational amount, higher efficiency and a more natural appearance of a floating window UI component, and further realizes timeliness, flexibility, and responsiveness of the floating window UI component.

The rotation algorithm in Embodiment 1 to Embodiment 3 is more specifically described as follows.

The orientation includes four values: portrait, reverse portrait, landscape and reverse landscape. Corresponding rotation angles (anticlockwise) are respectively 0 degree, 180 degrees, 90 degrees and 270 degrees. The foregoing orientations are successively converted into angle values. The orientation angle value of an activated-state application and the orientation angle value detected by a gravity sensor are respectively denoted as ContextDegree and SensorDegree.

The compensation angle is calculated according to the formula below:

$$\text{CompsateDegree} = -\text{ContextDegree} + \text{SensorDegree}.$$

The orientation (denoted as ContextOrientation) corresponding to a current Activity (a user click event) is acquired, and the Activity stack top is monitored, so as to track a change of the orientation that corresponds to the Activity.

In an implementation manner, the compensation directions of ContextDegree and SensorDegree are different. For ContextDegree, it is a clockwise direction, while for SensorDegree, it is an anticlockwise direction. Therefore, it is required to take an opposite number of ContextDegree, so that the direction thereof is the same as that of SensorDegree, and then superimposition is performed.

The current orientation (denoted as SensorOrientation) of the gravity sensor is acquired and a monitor of the gravity sensor is registered, so as to track the direction of the sensor.

When it is found that a change occurs in SensorOrientation of the gravity sensor or ContextOrientation of the stack top, corresponding rotation compensation is performed according to the acquired rotation recovery matrix. According to the Android display principle, the foregoing angles may be updated and stored to an attribute value of RotateLayout ViewGroup, and UI layout redesign and redrawing is forcibly triggered by using requestLayout( ) of RotateLayout. A whole process of layout redesign and redrawing is mainly as follows.

1. A measurement function onMeasure( ): If the rotation angle is 90 degrees/270 degrees, width and height are substituted with each other before measureChild( ); otherwise, remain the same.

2. A layout function onLayout( ): The rotation compensation matrix is calculated according to a current rotation angle by using Matrix. setRotate( ), and corresponding rotation is performed on display coordinates (equivalent to an outer border) of RotateLayout.

3. A drawing function onDraw( ): Rotation is performed on a Canvas that is passed in, so that a rotation result is embodied in drawing of RotateLayout.

4. Dispatch Drawing dispatchDraw( ): Before the Canvas is distributed to subviews, rotation compensation is performed on the Canvas by rotating the Canvas-alpha degrees around the central point of RotateLayout according to a current rotation angle alpha, so that a rotation property can be embodied during drawing of the subviews.

Due to the foregoing result, the subviews within RotateLayout does not need to process any rotation-related logic, for all rotations have been compensated by RotateLayout, and it seems that the subviews had not been rotated. However, this false appearance is merely based on drawing.

When a user performs a click in a floating window, similar to the foregoing layout redesign and redrawing logic, rotation compensation also needs to be performed on coordinates of the click position, so that the event can be delivered to a correct control. It mainly includes: in dispatchTouchEvent( ) of RotateLayout, after rotation pre-processing is performed according to the foregoing rotation matrix on coordinate values of a touch event (MotionEvent) that are passed in, the event is then delivered to a corresponding subview by using a touch event dispatch function super.dispatchTouchEvent(MotionEvent).

The following describes an apparatus for implementing rotation of a floating window according to the embodiments of the present invention, which are based on the same conception as the method for implementing rotation of a floating window. For details that are not elaborately described in the embodiments of the apparatus for implementing rotation of a floating window, reference may be made to the foregoing method embodiments.

Figure 4:
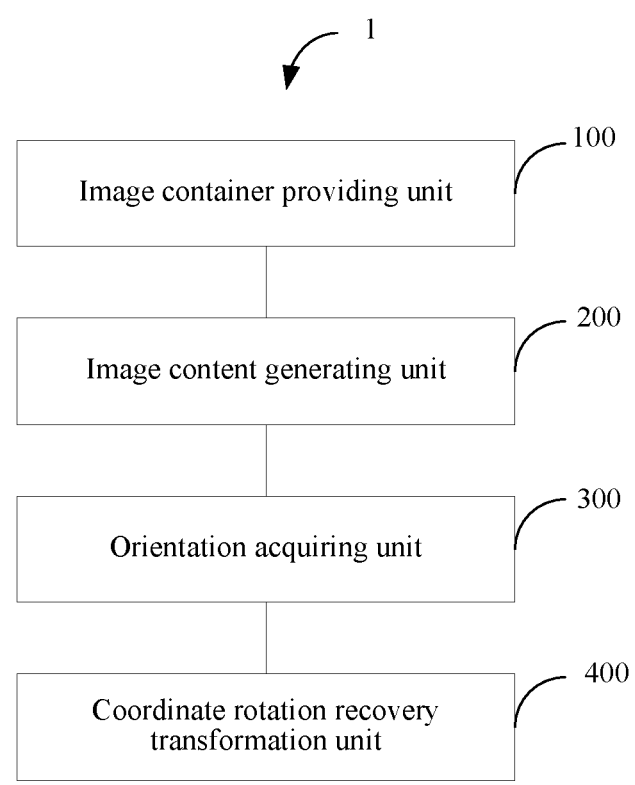
FIG. 4 is a schematic structural diagram of an apparatus for implementing rotation of a floating window according to an embodiment of the present invention.

Refer to FIG. 4, which is a schematic structural diagram of an apparatus 1 for implementing rotation of a floating window according to an embodiment of the present invention, including:
an image container providing unit 100, configured to provide an image container supporting a rotation attribute for a UI floating window view to be displayed;
an image content generating unit 200, configured to generate content that corresponds to the UI floating window view and add the content into the image container, the content being the UI floating window view;
an orientation acquiring unit 300, configured to acquire an orientation of the activity of a user click event and an orientation detected by a system, and if the orientation corresponding to a stack-top application of the system and/or the orientation detected by a system gravity sensor changes, perform rotation compensation, redraw the floating window, and acquire a rotation recovery matrix, where
in an implementation manner, rotation compensation is performed by acquiring a rotation angle of the UI floating window view; and
a coordinate rotation recovery transformation unit 400, configured to perform rotation recovery transformation on coordinates of the user click event, so that the event can be delivered to a corresponding internal UI component of the floating window.

In an implementation manner, the coordinate rotation recovery transformation unit 400 is configured to: perform, when a user click event is detected, rotation recovery transformation on the coordinates of the user click event according to the rotation recovery matrix, to obtain coordinates in the UI floating window view which correspond to the user click position before the UI floating window view is rotated, so that the event can be delivered to an internal UI component of the floating window, the component corresponding to the event before the orientation corresponding to the stack-top application of the system and/or the orientation detected by the system gravity sensor is changed.

In an implementation manner, the apparatus further includes a determination module, configured to determine whether the orientation corresponding to the current stack-top application of the system is changed, and determine, by the terminal device when the orientation angle of the stack-top application at a timeout moment of a stack-top application timer is different from the orientation angle of the stack-top application at a startup moment of the stack-top application timer, that the orientation corresponding to the current stack-top application of the system is changed.

The system is a terminal system having an Android platform, and the orientation angle value is a multiple of 90 degrees. In an implementation manner, the generating content that corresponds to the UI floating window view includes: generating the corresponding content View by using the method inflate( ) of inflater, and adding the content view into the image container.

In conclusion, the apparatus for implementing rotation of a floating window in this embodiment of the present invention generates a floating window UI component by redrawing a floating window and performing rotation recovery transformation on coordinates. In this way, the rotation of the floating window can be implemented without changing the original floating window UI component, modifying a large quantity of UI components, preparing multiple sets of images for selection, or displaying an animation. Therefore, efficiency of rotating the floating window is improved, and computational amount and complexity of the terminal device are reduced.

Figure 5:
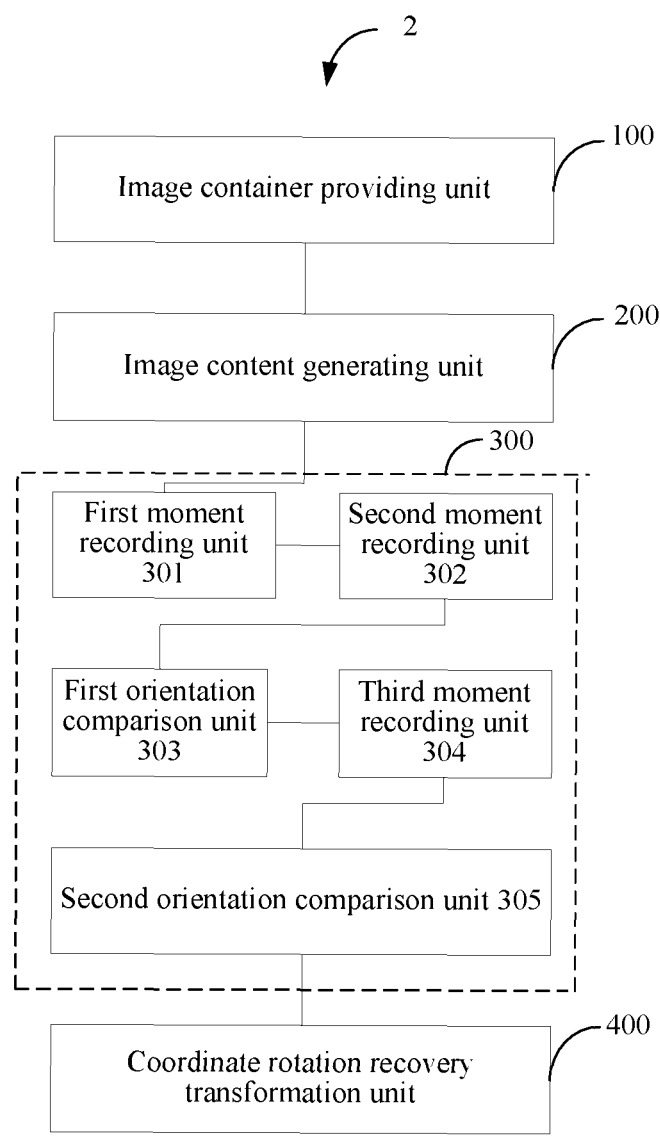
FIG. 5 is a schematic structural diagram of an apparatus for implementing rotation of a floating window according to another embodiment of the present invention.

Refer to FIG. 5, which is a schematic structural diagram of an apparatus 2 for implementing rotation of a floating window according to an embodiment of the present invention. The apparatus includes an image container providing unit 100, an image content generating unit 200, and a coordinate rotation inversion transformation unit 400 that are included in the first embodiment, and a difference therebetween lies in an orientation acquiring unit 300, which is specifically as follows.

The image container providing unit 100 is configured to provide an image container supporting a rotation attribute for a UI floating window view to be displayed.

The image content generating unit 200 is configured to generate content that corresponds to the UI floating window view and add the content into the image container, the content being the UI floating window view.

In an implementation manner, the image content generating unit 200 is configured to add the UI floating window view into the image container.

In an implementation manner, rotation compensation is performed by acquiring a rotation angle of the UI floating window view.

A first moment recording unit 301 is configured to acquire an orientation that corresponds to a current stack-top application of a system and an orientation detected by a system gravity sensor, record a first moment, and register a monitor for the system gravity sensor, start a system stack-top monitoring program, and set a time interval during which monitoring is performed.

The time interval for monitoring may be set to 30 sec to 2 min according to an actual situation. During this interval, it is possible that the orientation of the terminal is changed due to the rotation of the terminal, or the terminal returns to its original position after the rotation. A user action may be more clearly known according to the preset time interval, so as to perform an operation that further reduces memory computation.

A second moment recording unit 302 is configured to: when the orientation of the system gravity sensor is changed, notify the monitor, then recalculate, based on the monitor, an orientation value detected by the system gravity sensor, and record a second moment.

A first orientation comparison unit 303 is configured to compare the orientation acquired at the first moment with the orientation acquired at the second moment, and if they are different, perform rotation compensation, redraw the floating window and acquire a rotation inverse matrix.

Further, the first orientation comparison unit 303 in Embodiment 2 further includes the following units:
- a third moment recording unit 304, configured to wait for a preset time interval, re-acquire an orientation value that corresponds to a current stack-top application of the system, and record a third moment; and
- a second orientation comparison unit 305, configured to compare the orientation acquired at the second moment with the orientation acquired at the third moment, and if they are different, perform rotation compensation, redraw the floating window and acquire a rotation inverse matrix.

The coordinate rotation inversion transformation unit 400 is configured to perform rotation inverse transformation on coordinates of the user click event, so that the event can be accurately delivered to a corresponding internal UI component of the floating window.

In an implementation manner, the coordinate rotation recovery transformation unit 400 is configured to: perform, when a user click event is detected, rotation recovery transformation on the coordinates of the user click event according to the rotation recovery matrix, to obtain coordinates in the UI floating window view which correspond to a user click position before the UI floating window view is rotated, so that the event can be delivered to an internal UI component of the floating window, the component corresponding to the event before the orientation corresponding to the stack-top application of the system and/or the orientation detected by the system gravity sensor is changed.

In an implementation manner, the apparatus further includes a determination module, configured to determine whether the orientation corresponding to the current stack-top application of the system is changed, and determine, by the terminal device when the orientation angle of the stack-top application at a timeout moment of a stack-top application timer is different from the orientation angle of the stack-top application at a startup moment of the stack-top application timer, that the orientation corresponding to the current stack-top application of the system is changed.

In conclusion, in this embodiment, due to the use of a time interval, if the terminal detects that no change in orientation occurs from the first moment to the second moment, the following steps may be performed: discarding data obtained at the second moment or going back to the operations performed by the first moment recording unit 301; and operations such as redrawing the floating window and acquiring a rotation recovery matrix are performed only when a change in orientation is detected. In this way, a computational amount can be reduced, efficiency is improved, and an appearance of a floating window UI component is natural. Further, system resources are saved, and a computational amount of memory data is reduced.

Figure 6:
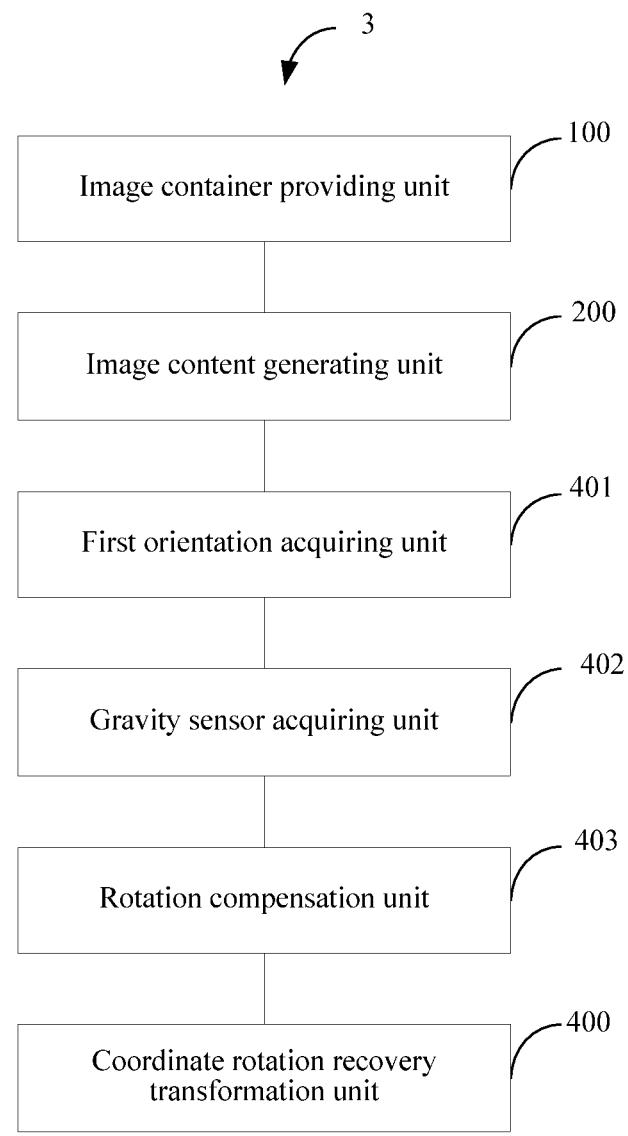
FIG. 6 is a schematic structural diagram of an apparatus for implementing rotation of a floating window according to still another embodiment of the present invention.

Refer to FIG. 6, which shows an apparatus 3 for implementing rotation of a floating window according to an embodiment of the present invention. Similar to most of the modules in the foregoing embodiment of FIG. 5, the apparatus includes an image container providing unit 100, an image content generating unit 200, and a coordinate rotation inversion transformation unit 400, and a difference therebetween lies in an orientation acquiring unit 300, which is specifically described as follows.

The image container providing unit 100 is configured to provide an image container supporting a rotation attribute for a UI floating window view to be displayed.

The image content generating unit 200 is configured to generate content that corresponds to an image and add the content into the image container, the content being the UI floating window view.

A first orientation acquiring unit 401 is configured to acquire a first orientation that corresponds to a current activity of a user click event and monitor the stack top of the activity, so as to track the change of the orientation that corresponds to the activity.

A user trend may be further confirmed by acquiring and monitoring the orientation at which a user performs click.

A gravity sensor acquiring unit 402 is configured to acquire a second orientation of a current gravity sensor and register the monitor of the gravity sensor, so as to track the change of the direction of the gravity sensor.

A transformation trend of the terminal may be further confirmed by acquiring and monitoring the orientation of the gravity sensor.

A rotation compensation unit 403 is configured to: when the first orientation or the second orientation is changed, perform rotation compensation, redraw the floating window, and acquire a rotation inverse matrix.

The coordinate rotation inversion transformation unit 400 is configured to perform rotation inverse transformation on coordinates of the user click event, so that the event can be accurately delivered to a corresponding internal UI component of the floating window.

Taking an Android platform as an example for description, an orientation (denoted as ContextOrientation) corresponding to a current Activity is acquired and the Activity stack top is monitored, so as to track the change of the orientation that corresponds to the Activity.

An orientation (denoted as SensorOrientation) of a current gravity sensor is acquired and a monitor of the gravity sensor is registered, so as to track a direction of the sensor.

In conclusion, in this embodiment, operations such as redrawing a floating window and acquiring a rotation inverse matrix are performed by tracking changes in orientations corresponding to a user click activity and a gravity sensor, so that the floating window UI component is implemented more concretely, meticulously and accurately. In this way, a computational amount can be reduced, efficiency is improved, and an appearance of a floating window UI component is more natural. Further, timeliness, flexibility, and responsiveness of the floating window UI component are realized.

The rotation algorithm mentioned in the foregoing apparatus embodiments is more specifically described as follows:

The orientation includes four values: portrait, reverse portrait, landscape and reverse landscape. Corresponding rotation angles (anticlockwise) are respectively 0 degree, 180 degrees, 90 degrees and 270 degrees. The foregoing two orientations are successively converted into angle values, which are respectively denoted as ContextDegree and SensorDegree.

The compensation angle is calculated according to the formula below:

CompsateDegree=−ContextDegree+SensorDegree.

When it is found that SensorOrientation of the gravity sensor or ContextOrientation of the stack bottom changes, corresponding rotation compensation is performed according to the foregoing compensation formula. According to the Android display principle, the foregoing angles may be updated and stored to an attribute value of RotateLayout ViewGroup, and UI layout redesign and redrawing is forcibly triggered by using requestLayout( ) of RotateLayout. A whole process of layout redesign and redrawing is mainly as follows:

1. onMeasure( ): If the rotation angle is 90 degrees/270 degrees, width and height are substituted with each other before measureChild( ); otherwise, remain the same.

2. onLayout( ): The rotation compensation matrix is calculated according to a current rotation angle by using Matrix. setRotate( ), and corresponding rotation is performed on display coordinates (equivalent to an outer border) of RotateLayout.

3. onDraw( ): Rotation is performed on a Canvas that is passed in, so that a rotation result is embodied in drawing of RotateLayout.

4. dispatchDraw( ): Before the Canvas is distributed to subviews, rotation compensation is performed on the Canvas by rotating the Canvas-alpha degrees around the central point of RotateLayout according to a current rotation angle alpha, so that a rotation property may be embodied during drawing of the subviews.

Due to the foregoing result, the subviews within RotateLayout does not need to process any rotation-related logic, for all rotations have been compensated by RotateLayout, and it seems that the subviews had not been rotated. However, this false appearance is merely based on drawing.

When a user performs a click in a floating window, similar to the foregoing layout redesign and redrawing logic, rotation compensation also needs to be performed on coordinates of the click position, so that the event can be delivered to a correct control. It mainly includes: in dispatchTouchEvent( ) of RotateLayout, after rotation pre-processing is performed according to the foregoing rotation matrix on coordinate values of MotionEvent that are passed in, the event is then delivered to a corresponding subview by using super.dispatchTouchEvent(MotionEvent).

Figure 7:
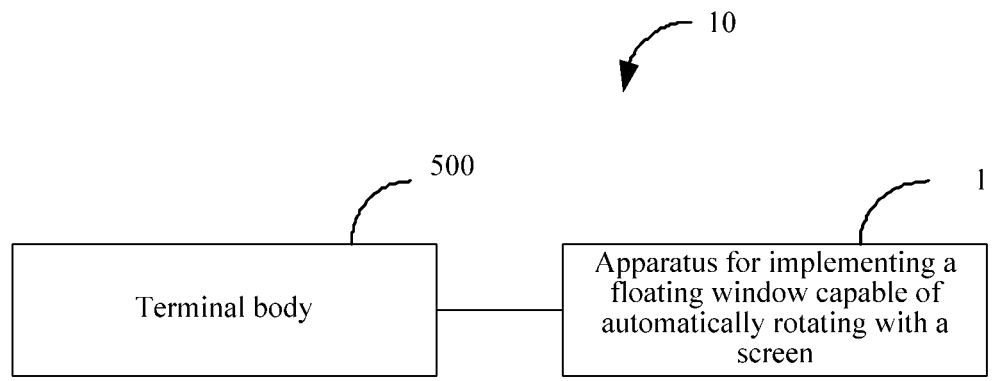
FIG. 7 is a schematic structural diagram of a system for implementing rotation of a floating window according to an embodiment of the present invention.

Refer to FIG. 7, which shows a system 10 for implementing rotation of a floating window according to an embodiment of the present invention. The system 10 includes a terminal body 500, and further includes an apparatus for implementing rotation of a floating window, the apparatus being connected to the terminal body 500. In an implementation manner, the apparatus is the same as the apparatus 1 according to the foregoing embodiment of the present invention, and details are not described herein again.

Because the apparatus for implementing rotation of a floating window is included, the following effect is achieved.

The terminal in this technical solution generates a floating window UI component by "false appearances" such as redrawing of the floating window and rotation inversion transformation of coordinates, without modifying the original floating window UI component. In this way, it is not required to modify a large quantity of UI components, prepare multiple sets of images for selection, or display an animation, thereby improving efficiency, reducing computational complexity, and making an appearance of the floating window UI component more natural.

Figure 8:
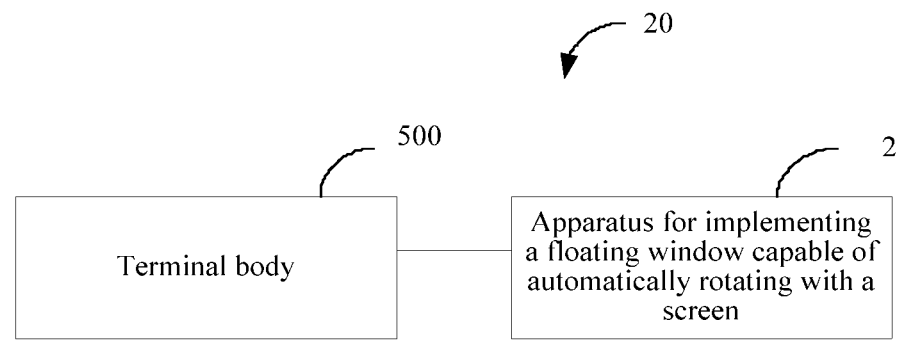
FIG. 8 is a schematic structural diagram of a system for implementing rotation of a floating window according to another embodiment of the present invention.

Referring to FIG. 8, according to an embodiment of the present invention, a system 20 for implementing rotation of a floating window includes a terminal body 500, and the system 20 has an apparatus for implementing rotation of a floating window, the apparatus being connected to the terminal body 500. In an implementation manner, the apparatus is the same as the apparatus 2 according to the foregoing embodiment of the present invention, and details are not described herein again.

Because the apparatus for implementing rotation of a floating window is included, the following effect is achieved.

Due to the use of a time interval, if the terminal detects that no change in orientation occurs from the first moment to the second moment, the following steps may be performed: discarding data acquired at the second moment, or going back to the operations performed by the first moment recording unit 301, or the like; and operations such as redrawing the floating window and acquiring a rotation inverse matrix are performed only when a change in orientation is detected. In this way, computational amount is reduced, efficiency is improved, and an appearance of a floating window UI component is more natural. Further, system resources are saved, and computation of memory data is reduced. In an implementation manner, the apparatus is the same as the apparatus 3 according to the foregoing embodiment of the present invention, and details are not described herein again.

Figure 9:
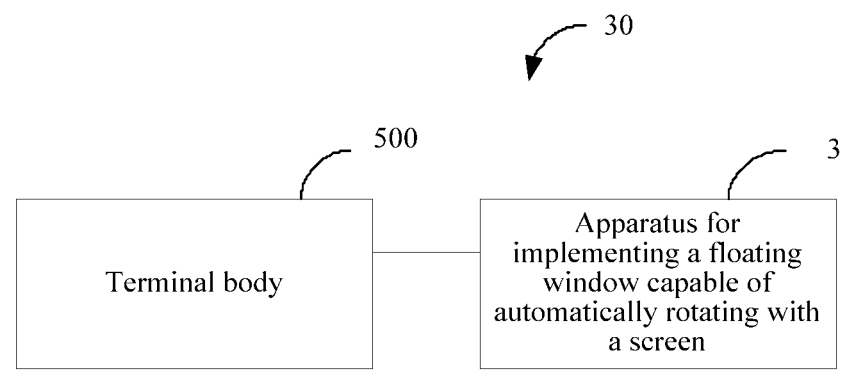
FIG. 9 is a schematic structural diagram of a system for implementing rotation of a floating window according to still another embodiment of the present invention.

Refer to FIG. 9, according to an embodiment of the present invention, a terminal 30 for implementing rotation of a floating window includes a terminal body 500, and the terminal 30 further includes an apparatus for implementing rotation of a floating window, the apparatus being connected to the terminal body 500.

Because the apparatus for implementing rotation of a floating window is included, the following effect is achieved.

In this embodiment, the terminal 30 performs operations such as redrawing the floating window and acquiring a rotation inverse matrix by tracking changes in orientations corresponding to a user click activity and a gravity sensor, so that the floating window UI component is presented more concretely, meticulously and accurately. In this way, a computational amount can be reduced, efficiency is improved, and an appearance of a floating window UI component is more natural. Further, timeliness, flexibility, and responsiveness of the floating window UI component are realized.

The terminal 500 described in FIG. 7 to FIG. 9 specifically includes: a smart phone, an e-book reader, an MP3 player, an MP4 player, a notebook computer, a tablet computer, and the like.

A person of ordinary skill in the art may understand that, all or some of the steps of the foregoing embodiments may be implemented by hardware or a program instructing relevant hardware. The program may be stored in a computer-readable storage medium. The storage medium may be a memory, a magnetic disk, an optical disc, or the like.

The above merely shows preferred embodiments of the present invention. A person of ordinary skill in the art may make changes to the specific implementation manners and application scope based on the concept of the present disclosure. Content of this specification shall not be understood as a limitation to the present disclosure.

What is claimed is:

1. A method for implementing rotation of a floating window, comprising:
    providing, by a terminal device, an image container supporting a rotation attribute for a user interface (UI) floating window view to be displayed;
    adding, by the terminal device, the UI floating window view into the image container;
    when an orientation corresponding to a stack-top application in an activated-state application stack of a system and/or an orientation detected by a gravity sensor of the system is changed, acquiring, by the terminal device, a rotation angle of the UI floating window view, redrawing the UI floating window view which has been rotated according to the rotation angle and the image container, and acquiring a rotation recovery matrix; and
    when a user click event is detected, performing, by the terminal device, rotation recovery transformation on coordinates of a user click position according to the rotation recovery matrix and the image container, to obtain coordinates in the UI floating window view which coordinates correspond to the user click position before the UI floating window view is rotated, so that the event can be delivered to an internal UI component of the floating window which corresponds to the event before the UI floating window view is rotated.

2. The method according to claim 1, wherein the system is a terminal system having an Android platform.

3. The method according to claim 1, wherein the rotation angle is an integer multiple of 90 degrees.

4. The method according to claim 1, further comprising:
    determining, by the terminal device, whether the orientation currently corresponding to the stack-top application of the system is changed; and
    determining, by the terminal device when the orientation angle of the stack-top application at a timeout moment of a stack-top application timer is different from the orientation angle of the stack-top application at a startup moment of the stack-top application timer, that the orientation currently corresponding to the stack-top application of the system is changed.

5. The method according to claim 1, wherein when an orientation corresponding to a stack-top application of a system and/or an orientation detected by a gravity sensor of the system is changed, acquiring, by the terminal device, a rotation angle of the UI floating window view comprises:
    acquiring, by the terminal device when the orientation corresponding to the stack-top application of the system is changed, a rotation angle that corresponds to the stack-top application;
    acquiring, by the terminal device when the orientation detected by the gravity sensor of the system is changed, a rotation angle that is detected by the gravity sensor of the system;
    acquiring, by the terminal device when the orientation corresponding to the stack-top application of the system and the orientation detected by the gravity sensor of the system both are changed, a sum of the rotation angle that corresponds to the stack-top application and the rotation angle that is detected by the gravity sensor of the system.

6. The method according to claim 1, wherein acquiring a rotation recovery matrix comprises:
    obtaining the rotation recovery matrix:

$$\begin{bmatrix} \cos\theta & -\sin\theta & x_f(1-\cos\theta)+y_f\sin\theta \\ \sin\theta & \cos\theta & y_f(1-\cos\theta)-x_f\sin\theta \\ 0 & 0 & 1 \end{bmatrix}$$

according to coordinates $(x_f, y_f)$ obtained after rotation and the rotation angle.

7. The method according to claim 1, wherein the orientation comprises: portrait, reverse portrait, landscape or reverse landscape.

8. An apparatus for implementing rotation of a floating window, comprising:
    one or more processors; and
    a memory storing program instructions, that, when executed by the one or more processors, configure the apparatus to:
    provide an image container supporting a rotation attribute for a user interface (UI) floating window view to be displayed;
    add the UI floating window view into the image container;
    when an orientation corresponding to a stack-top application of a system and/or an orientation detected by a gravity sensor of the system is changed, acquire a rotation angle of the UI floating window view, redraw the UI floating window which has been rotated according to the rotation angle, and acquire a rotation recovery matrix; and
    when a user click event is detected, perform rotation recovery transformation on coordinates of the user click event according to the rotation recovery matrix, to obtain coordinates in the UI floating window view which coordinates correspond to a user click position before the UI floating window view is rotated, so that the event can be delivered to an internal UI component of the floating window which corresponds to the event before the UI floating window view is rotated.

9. The apparatus according to claim 8, wherein the system is a terminal system having an Android platform.

10. The apparatus according to claim 8, wherein the orientation angle is an integer multiple of 90 degrees.

11. The apparatus according to claim 8, wherein the apparatus is further configured to:
    determine whether the orientation currently corresponding to the stack-top application of the system is changed, and determine, by the terminal device, when the orientation angle of the stack-top application at a timeout moment of a stack-top application timer is different from the orientation angle of the stack-top application at a startup moment of the stack-top application timer, that the orientation currently corresponding to the stack-top application of the system is changed.

12. The apparatus according to claim 8, wherein the apparatus is further configured to: acquire, by the terminal device when the orientation corresponding to the stack-top application of the system is changed, a rotation angle that corresponds to the stack-top application; acquire, by the terminal device when the orientation detected by the gravity sensor of the system is changed, a rotation angle that is detected by the gravity sensor of the system; acquire, by the terminal device when the orientation corresponding to the stack-top application of the system and the orientation detected by the gravity sensor of the system both are changed, a sum of the rotation angle that corresponds to the stack-top application and the rotation angle that is detected by the gravity sensor of the system.

13. The apparatus according to claim 8, wherein the apparatus is further configured to obtain the rotation recovery matrix:

$$\begin{bmatrix} \cos\theta & -\sin\theta & x_f(1-\cos\theta)+y_f\sin\theta \\ \sin\theta & \cos\theta & y_f(1-\cos\theta)-x_f\sin\theta \\ 0 & 0 & 1 \end{bmatrix}$$

according to coordinates $(x_f, y_f)$ obtained after rotation and the rotation angle.

14. The apparatus according to claim 8, wherein the orientation comprises: portrait, reverse portrait, landscape or reverse landscape.

15. A non-transitory computer-readable storage medium, the medium storing a computer program which comprises instructions for enabling a computer to execute the following steps:
  providing an image container supporting a rotation attribute for a user interface (UI) floating window view to be displayed;
  adding the UI floating window view into the image container;
  when an orientation corresponding to a stack-top application in an activated-state application stack of a system and/or an orientation detected by a gravity sensor of the system is changed, acquiring a rotation angle of the UI floating window view, redrawing the UI floating window view which has been rotated according to the rotation angle and the image container, and acquiring a rotation recovery matrix; and
  when a user click event is detected, performing rotation recovery transformation on coordinates of a user click position according to the rotation recovery matrix and the image container, to obtain coordinates in the UI floating window view which coordinates correspond to the user click position before the UI floating window view is rotated, so that the event can be delivered to an internal UI component of the floating window which corresponds to the event before the UI floating window view is rotated.

16. The computer-readable storage medium according to claim 15, wherein the instructions further comprise instructions for enabling the computer to execute the following steps:
  determining whether the orientation currently corresponding to the stack-top application of the system is changed; and
  determining, when the orientation angle of the stack-top application at a timeout moment of a stack-top application timer is different from the orientation angle of the stack-top application at a startup moment of the stack-top application timer, that the orientation currently corresponding to the stack-top application of the system is changed.

17. The computer-readable storage medium according to claim 15, wherein the instructions further comprise instructions for enabling the computer to execute the following step:
  acquiring, when the orientation corresponding to the stack-top application of the system is changed, a rotation angle that corresponds to the stack-top application;
  acquiring, when the orientation detected by the gravity sensor of the system is changed, a rotation angle that is detected by the gravity sensor of the system;
  acquiring, when the orientation corresponding to the stack-top application of the system and the orientation detected by the gravity sensor of the system both are changed, a sum of the rotation angle that corresponds to the stack-top application and the rotation angle that is detected by the gravity sensor of the system.

18. The computer-readable storage medium according to claim 15, wherein the instructions comprise instructions for enabling the computer to execute the following step:
  obtaining the rotation recovery matrix:

$$\begin{bmatrix} \cos\theta & -\sin\theta & x_f(1-\cos\theta)+y_f\sin\theta \\ \sin\theta & \cos\theta & y_f(1-\cos\theta)-x_f\sin\theta \\ 0 & 0 & 1 \end{bmatrix}$$

according to coordinates $(x_f, y_f)$ obtained after rotation and the rotation angle.

* * * * *